United States Patent
Araki et al.

(10) Patent No.: US 7,574,791 B2
(45) Date of Patent: Aug. 18, 2009

(54) METHOD TO FABRICATE SIDE SHIELDS FOR A MAGNETIC SENSOR

(75) Inventors: Satoru Araki, San Jose, CA (US); Robert Stanley Beach, Los Gatos, CA (US); Marie-Claire Cyrille, San Jose, CA (US); Wipul Pemsiri Jayasekara, Los Gatos, CA (US); Quang Le, San Jose, CA (US); Jui-Lung Li, San Jose, CA (US); David John Seagle, Morgan Hill, CA (US); Howard Gordon Zolla, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 600 days.

(21) Appl. No.: 11/126,508

(22) Filed: May 10, 2005

(65) Prior Publication Data

US 2006/0256482 A1    Nov. 16, 2006

(51) Int. Cl.
*G11B 5/187* (2006.01)
(52) U.S. Cl. ............. 29/603.14; 29/603.12; 29/603.15; 216/40; 216/42; 360/324.2
(58) Field of Classification Search ............. 29/603.14, 29/603.13, 603.12, 603.15; 216/40, 42; 204/192.1; 438/691, 692; 360/324.2, 325, 324.11
See application file for complete search history.

(56) References Cited

U.S. PATENT DOCUMENTS

| 6,052,261 | A * | 4/2000 | Watanabe et al. ........ 204/192.1 |
| 6,317,300 | B1 * | 11/2001 | Sasaki et al. ................ 360/325 |
| 6,489,216 | B1 * | 12/2002 | Shiu et al. ............... 438/692 X |
| 6,525,905 | B1 | 2/2003 | Susaki |
| 6,553,649 | B1 | 4/2003 | Santini |
| 6,665,152 | B2 | 12/2003 | Nemoto |
| 2004/0085684 | A1 | 5/2004 | Basra et al. |
| 2004/0105196 | A1 | 6/2004 | Kataoka |

FOREIGN PATENT DOCUMENTS

JP          11-66520       * 3/1999

* cited by examiner

*Primary Examiner*—A. Dexter Tugbang
(74) *Attorney, Agent, or Firm*—Zilka-Kotab, PC

(57) ABSTRACT

A method for fabricating magnetic side shields for an MR sensor of a magnetic head. Following the deposition of MR sensor layers, a first DLC layer is deposited. Milling mask layers are then deposited, and outer portions of the milling mask layers are removed such that a remaining central portion of the milling mask layers is formed having straight sidewalls and no undercuts. Outer portions of the sensor layers are then removed such that a relatively thick remaining central portion of the milling mask resides above the remaining sensor layers. A thin electrical insulation layer is deposited, followed by the deposition of magnetic side shields. A second DLC layer is deposited and the remaining mask layers are then removed utilizing a chemical mechanical polishing (CMP) liftoff step. Thereafter, the first DLC layer and the second DLC layer are removed and a second magnetic shield layer is then fabricated thereabove.

21 Claims, 8 Drawing Sheets

METHOD TO FABRICATE SIDE SHIELDS FOR A MAGNETIC SENSOR

BACKGROUND OF THE INVENTION

1. Field of the Invention

The present invention relates generally to spin valve sensors for magnetic heads, and more particularly to an improved tunnel valve MR sensor having a draped second magnetic shield.

2. Description of the Prior Art

Magnetic heads for hard disk drives typically have a read head portion including a magnetoresistive (MR) spin valve sensor structure for reading data from the disk of the hard disk drive. As is well known to those skilled in the art, such MR sensor structures include a plurality of thin film layers disposed between two magnetic shields that define the read gap. The thin film layers have particular magnetic properties, and are sensitive to the magnetic field of the data bits on the hard disk.

Recently developed read heads may use a tunnel junction sensor, also known as a "tunnel valve", abbreviated "TV", for reading the magnetic data bit signals from the hard disk. The TV sensor typically includes a nonmagnetic tunneling barrier layer sandwiched between a pinned magnetic layer and a free magnetic layer. The TV sensor is itself typically sandwiched between first and second magnetic shield layers that also serve as first and second electrical lead layers, and are connected to the tunnel junction sensor for conducting a tunneling current through it. The TV sensor is therefore configured to conduct Current Perpendicular to the Plane (CPP) of the film layers of the sensor. When reading data, a magnetic data bit of a hard disk will cause the direction of the magnetization of the free magnetic field layer to change, whereupon the electrical resistance of the sensor changes. This change in resistance affects the electrical current passing through the sensor, which is thus detected as a data signal.

Improved hard disk drives are manufactured with an ever increasing areal data storage density, which requires narrower and more closely spaced data tracks on the hard disk. As a result, the MR sensors must be fabricated with a reduced read track width, and stray magnetic shields from more closely spaced adjacent data tracks can generate noise in the sensor signals. In response MR sensors have been developed in which the second magnetic shield is draped around the MR sensor to provide magnetic shielding and thereby reduce the noise created from adjacent data tracks. Current methods to create such draped shield MR sensors have certain drawbacks, as described herebelow, which inhibit the reduction of the read track width of the sensor. The present invention provides a remedy for these problems.

SUMMARY OF THE INVENTION

The present invention is a method for fabricating magnetic side shields for an MR sensor of a magnetic head for a hard disk drive. Following the deposition of sensor layers, a first diamond-like-carbon (DLC) layer is deposited. Milling mask layers are deposited upon the first DLC layer, and outer portions of the milling mask layers are removed such that a remaining central portion of the milling mask layers is formed having straight sidewalls and no undercuts. Outer portions of the sensor layers are then removed such that a relatively thick remaining central portion of the milling mask resides above the remaining sensor layers. A thin electrical insulation layer is deposited, followed by the deposition of magnetic side shields, where the thickness of the magnetic side shields is approximately equal to the thickness of the sensor layers. A second DLC layer is deposited and the remaining mask layers are then removed utilizing a chemical mechanical polishing (CMP) liftoff step. Thereafter, the first DLC layer and the second DLC layer are removed such that the top surface of the magnetic side shields is exposed. A second magnetic shield layer is then fabricated thereabove that is preferably exchange coupled with the side shields.

It is an advantage of the method for fabricating a magnetic head of the present invention that an improved MR sensor is created.

It is another advantage of the method for fabricating a magnetic head of the present invention that an improved tunnel valve MR sensor is created.

It is a further advantage of the method for fabricating a magnetic head of the present invention that an MR sensor having improved magnetic side shields is created.

It is yet another advantage of the method for fabricating a magnetic head of the present invention that an improved MR sensor having draped side magnetic shields and improved sensor current flow is created.

It is yet a further advantage of the method for fabricating a magnetic head of the present invention that an MR sensor having a decreased read track width and improved sensor current flow is created.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
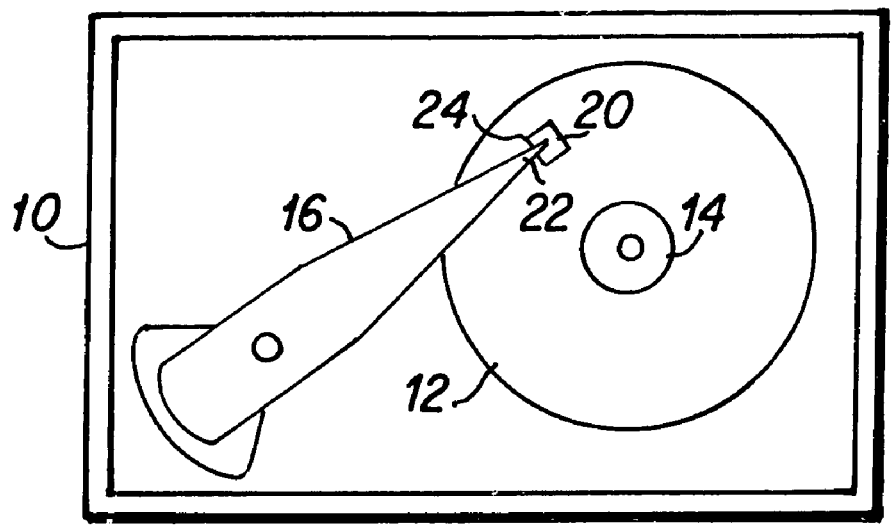
FIG. 1 is a top plan view generally depicting a hard disk drive that includes a magnetic head of the present invention.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a slider 24 including a magnetic head 20 of the present invention disposed upon a distal end 22 of the actuator arm 16. A typical hard disk drive 10 may include a plurality of disks 12 that are rotatably mounted upon the spindle 14 and a plurality of actuator arms 16 each having one or more sliders 24 mounted upon the distal end 22 of the actuator arms. As is well known to those skilled in the art, when the hard disk drive 10 is operated, the hard disk 12 rotates upon the spindle 14 and the slider 24 with the magnetic head 20 acts as an air bearing that is adapted for flying above the surface of the rotating disk. The slider 24 includes a substrate base upon which the various layers and structures that form the magnetic head are fabricated. Such sliders with magnetic heads are fabricated in large quantities upon a wafer substrate and subsequently sliced into discrete devices.

Figure 2:
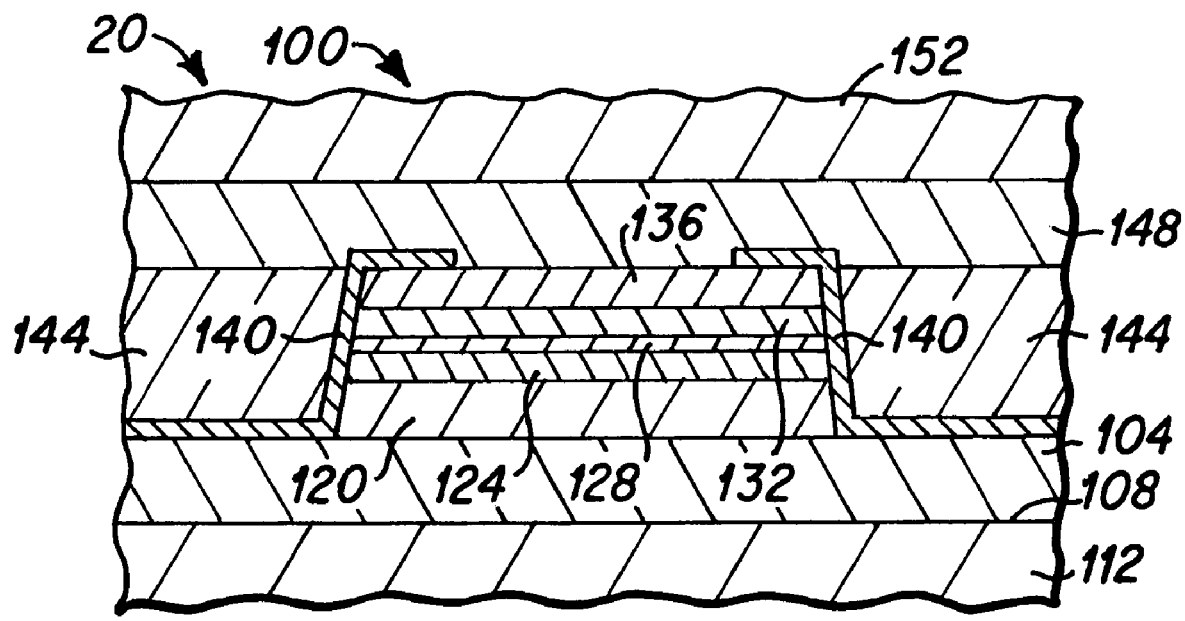
FIG. 2 is a front plan view of the structure of a typical prior art tunnel valve read sensor portion of a magnetic head as seen from the ABS.

A typical magnetic head 20 is fabricated to include a read head portion for reading data from the hard disk and a write head portion for writing to a hard disk, and FIG. 2 is a generalized depiction of a read head portion 100 of a magnetic head 20 which will serve as a starting point for the description of the novel read head features of the present invention that follow.

FIG. 2 depicts a typical prior art tunnel valve MR sensor 100 of a magnetic head 20 that is a Current-Perpendicular-to-Plane (CPP) device. As depicted in FIG. 2, the typical tunnel valve sensor includes a first magnetic shield layer 104 that is fabricated upon the surface 108 of a substrate base 112. A PtMn antiferromagnetic layer 120 is next deposited upon the first magnetic shield layer 104. A pinned magnetic layer structure 124 such as CoFe/Ru/CoFe is deposited upon the antiferromagnetic layer 120 and a thin tunnel valve layer 128 that is composed of a material such as alumina is deposited upon the pinned magnetic layer 124. A free magnetic layer 132 is deposited above the tunnel valve layer 128 and an in-stack magnetic biasing layer structure 136, as is known to those skilled in the art, is deposited upon the free magnetic layer 132. Using photolithographic masking and etching techniques, as are described in detail herebelow, outer portions of the sensor layers are removed such that the central portions depicted in FIG. 2 remain. Thereafter, an electrically insulative material 140, such as alumina, is deposited next to the sensor layers. The remaining portions of the mask are removed and a second magnetic shield is then fabricated. In fabricating the second magnetic shield, side portions 144 of the second magnetic shield are first deposited along side the sensor layers to provide magnetic shielding of the sensor layers from stray magnetic fields; this is termed a draped magnetic shield. An upper second magnetic shield layer 148 is subsequently deposited. Further well known write head structures (generally indicated as 152) are subsequently fabricated to complete the magnetic head. When the MR sensor 100 is operated, the first and second magnetic shield layers act as electrical leads for the sensor, where the electrical current through the sensor is perpendicular to the plane of the sensor layers (CPP), and the alumina insulation 140 causes sensor current to flow through the sensor layers.

A tunnel valve magnetoresistive spin valve sensor, such as is depicted in FIG. 2 operates by detecting magnetic data bits written upon the hard disk 12 through a change in electrical resistance within the sensor when the sensor is exposed to the magnetic field of the data bit. Specifically, the orientation of the free layer magnetization is altered by the magnetic field of a data bit, and the change in the orientation of the free layer magnetization creates a change in the electrical resistance of the sensor. This change in the resistance then affects the electrical current flowing through the sensor, and the change in sensor current flow is detected and interpreted as a data signal.

The present invention focuses upon an improved method for fabricating the draped side shields of the second magnetic shield, and the prior art draped shield manufacturing method is next described in order to provide a further understanding of the novel features of the present invention that are thereafter described.

Figure 3:
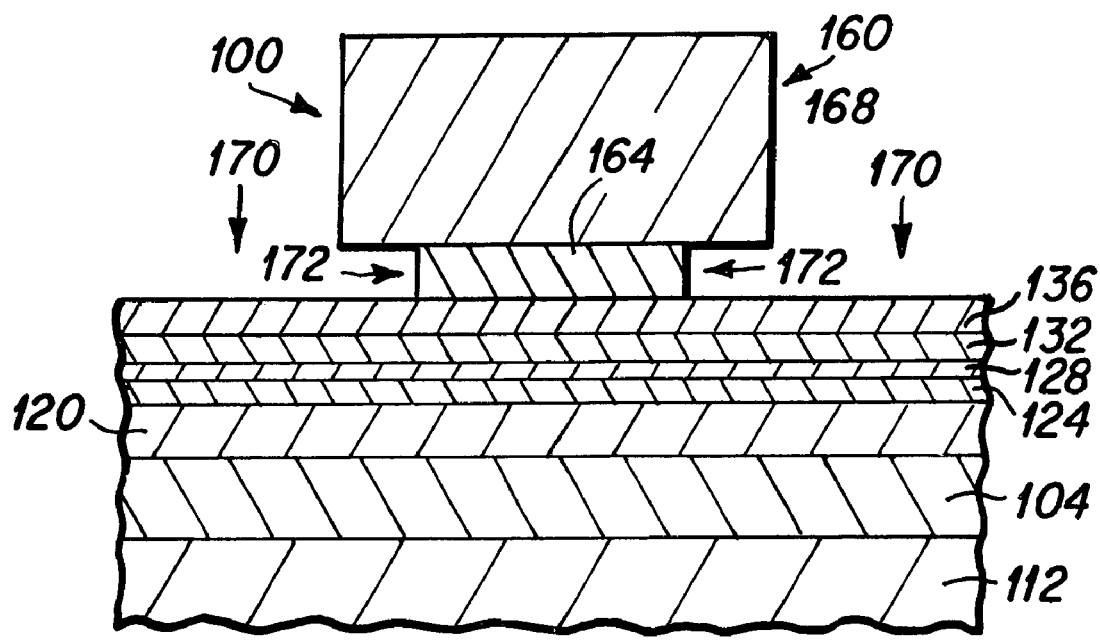
FIGS. 3-6 are side cross-sectional views depicting steps undertaken in the fabrication of the prior art magnetic head depicted in FIG. 2.

FIG. 3 is a side cross-sectional view depicting a manufacturing step of the tunnel junction magnetoresistive sensor of the prior art. As depicted therein, the several layers of the magnetoresistive sensor 100 have been deposited across the surface of the wafer substrate base 112; these layers including the first magnetic shield layer 104, antiferromagnetic layer 120, pinned magnetic layer structure 124, tunnel valve layer 128, free magnetic layer 132 and hard bias structure 136. Thereafter, a bilayer photolithographic mask 160, including a thin first layer 164 and a thicker second layer 168, is fabricated at the desired location of the MR sensor; outer portions 170 of the sensor layer are not covered by the mask 160. Significantly, the prior art bilayer mask 160 is formed with undercuts 172 which facilitate the later wet chemical removal of the mask.

Figure 4:
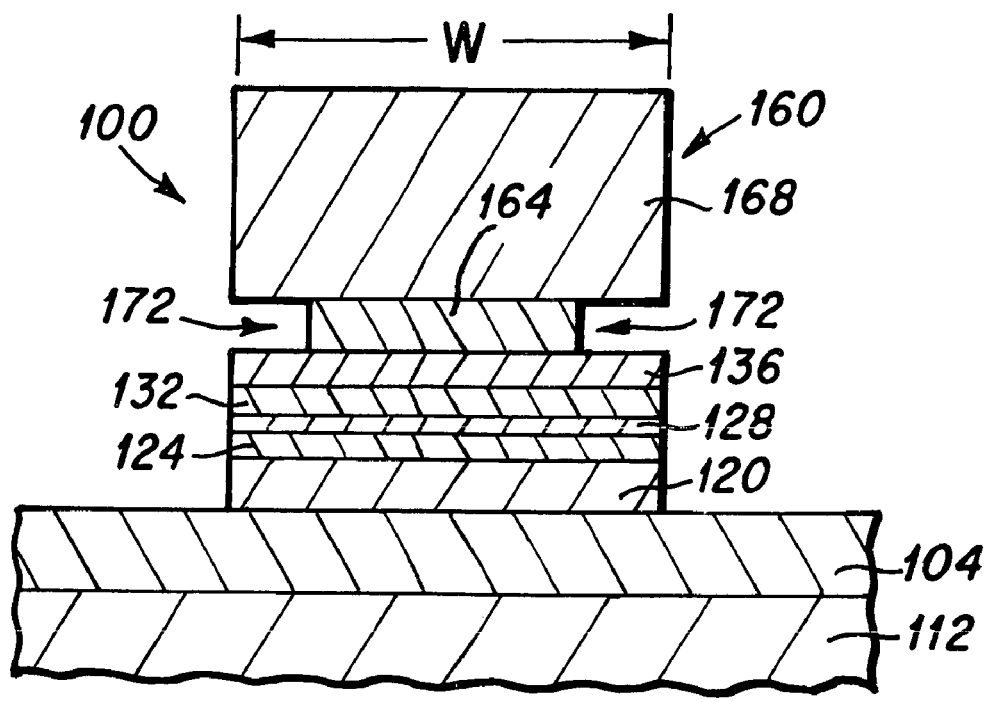
Figure 5:
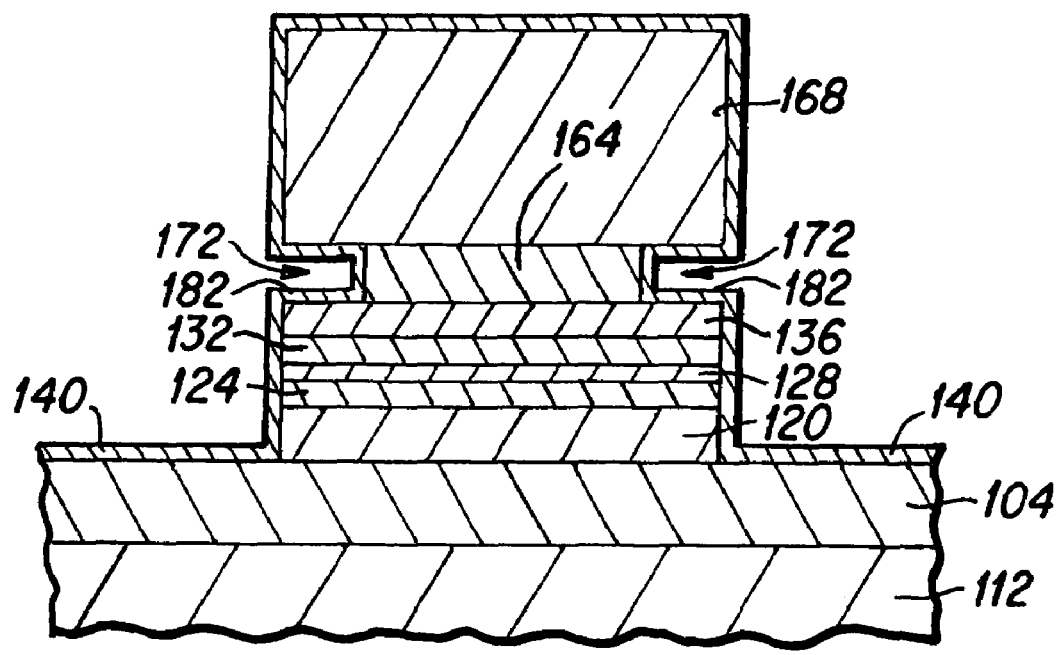

As is next depicted in FIG. 4, an ion milling step is performed in which the unmasked outer portions 170 (see FIG. 3) of the sensor layers are removed. The width W of the second layer 168 of the bilayer mask 160 therefore serves to define the read track width of the MR sensor of the magnetic head. As is next depicted in FIG. 5, the electrical insulation layer 140, such as alumina, is deposited across the surface of the wafer. The preferred alumina deposition process is an atomic layer deposition (ALD) process as is known to those skilled in the art. The ALD process is particularly desirable because it results in an alumina layer 140 that is very conformal to the horizontal and vertical surfaces upon which it is deposited. This conformal deposition feature results in the deposition of a thin, uniform alumina layer 140, without undesirable pin holes, upon both vertical and horizontal surfaces of the sensor. Significantly, an undesirable effect of the ALD deposition process in the prior art sensor is that alumina 182 is deposited within the undercuts 172 of the bilayer mask 160. These alumina deposits 182 within the undercuts are undesirable, as is described herebelow.

Figure 6:
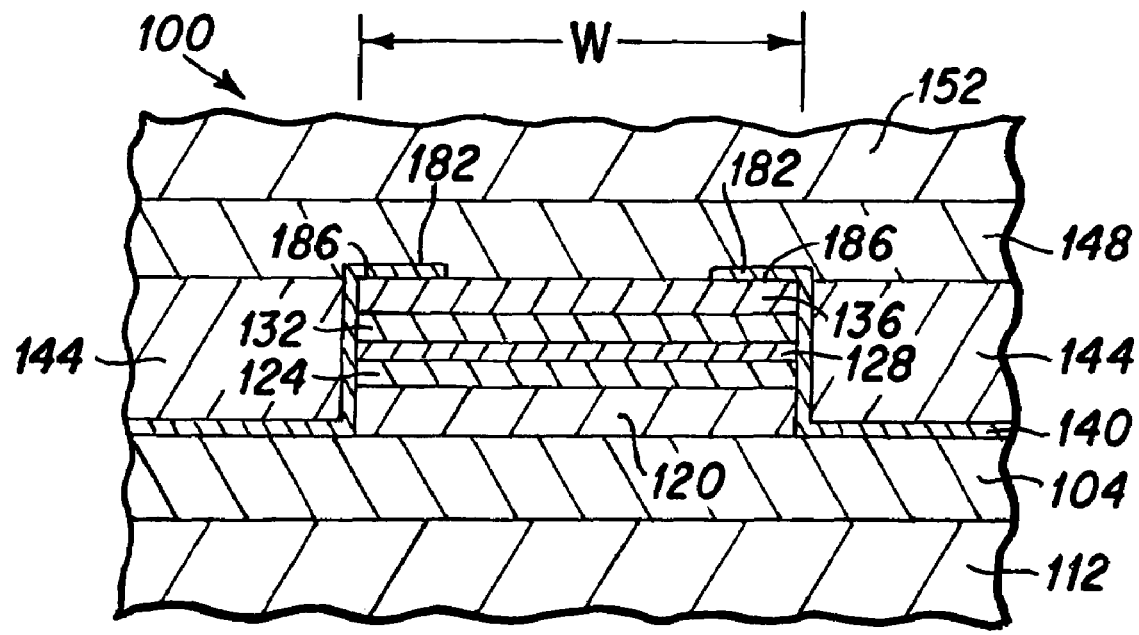

As depicted in FIG. 6, a wet chemical stripping process is next performed to remove the photomask 160. As is known to those skilled in the art, the undercuts 172 aid in the chemical stripping and removal of the photomask material. It is significant to note that the alumina 182 that was deposited within the undercuts remains on top of portions 186 of the sensor top surface. Thereafter, the second magnetic shield 148, including the draped side shields 144, is fabricated upon the sensor in standard shield fabrication process steps. This may include the deposition of a seed layer (not shown) followed by the electroplating of the draped magnetic shield structure members 144 and the deposition of the second magnetic shield layer 148. Thereafter, further well known magnetic head fabrication steps are conducted to complete the fabrication of the magnetic head.

As described above, when a magnetic head that includes the draped shield tunnel junction sensor described hereabove is utilized, electrical current flows from the first magnetic shield, through the sensor layers to the second magnetic shield. Significantly, as is best seen in FIG. 6, the electrically insulative alumina 182 that is deposited upon the surface portions 186 of the top MR sensor layers can form an undesirable restriction in the current flow through the sensor layers to the second magnetic shield 148 by constricting the sensor current flow path between the bias structure 136 and the second magnetic shield 148. Furthermore, in more advanced magnetic head designs the track width W of magnetic sensors is continually being reduced in order to increase the areal data storage density of hard disk drives, and the unwanted restriction in the sensor electrical current flow caused by the unwanted alumina deposits 182 is becoming problematical as W is reduced. The manufacturing method of the present invention provides for an improved sensor masking method and mask removal method in which the unwanted alumina depositions 182 are not formed. The method of the present invention therefore is desirable for the fabrication of MR sensors having a reduced track width. The manufacturing steps of the present invention are next discussed with the aid of FIGS. 7-16.

Figure 7:
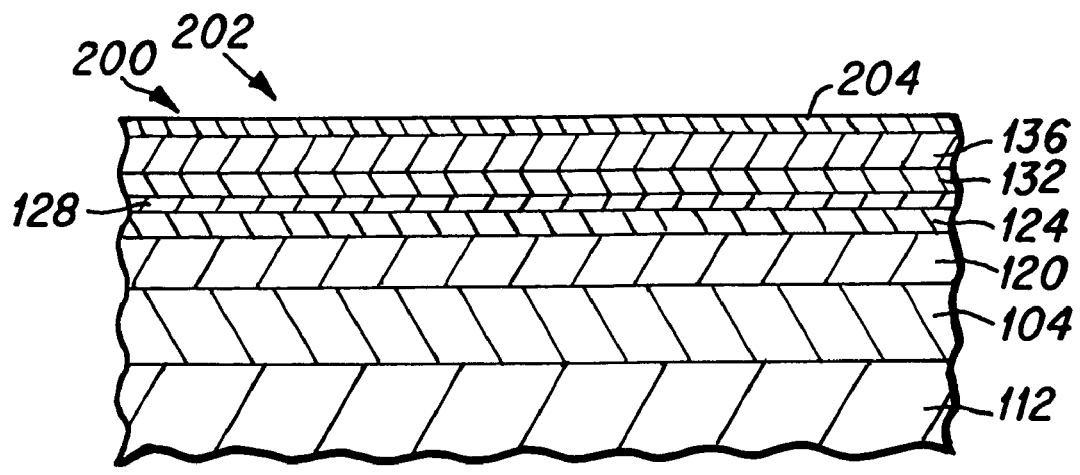
FIGS. 7-16 are side cross-sectional views depicting steps undertaken in the fabrication of a magnetic head of the present invention.
Figure 8:
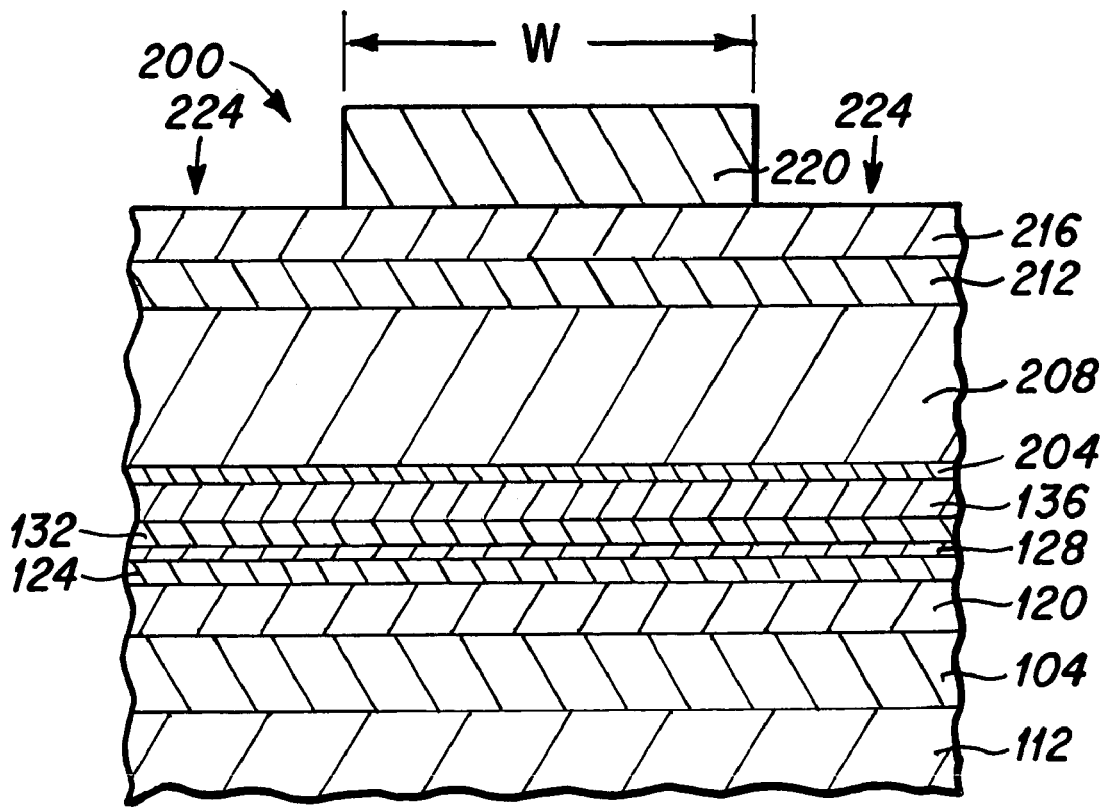

FIG. 7 is a side cross-sectional view of a fabrication step of an MR sensor 200 of a magnetic head 202 of the present invention including the several sensor layers as are known in the prior art and described hereabove. Particularly, the sensor layers may include a first magnetic shield layer 104, an antiferromagnetic layer 120, a pinned magnetic layer structure 124, a tunnel valve layer 128, a free magnetic layer 132 and a hard bias structure 136. Thereafter, a first, thin diamond-like-carbon (DLC) layer 204 is deposited across the surface of the wafer. The first DLC layer may have a thickness of approximately 10-20 nm. Thereafter, as depicted in FIG. 8, milling mask layers are deposited across the surface of the wafer. The milling mask layers may include an organic material layer 208, comprised of a material such as Duramide in a thickness of approximately 600-1200 nm, and a silicon dioxide layer 212 having a thickness of approximately 80-120 nm. A second organic material layer 216, which acts as a base anti-reflection coating (barc) in a photolithographic process, having a thickness of approximately 80-120 nm and which may be composed of a material such as Duramide is next deposited. A photoresist layer is then deposited and subsequently photolithographically processed to create a hard photoresist mask 220 having a width W. Outer portions 224 of the barc layer 216 are not covered by the photoresist mask 220. Other combinations of milling mask layers and thicknesses can work well in the present invention, and the present invention is not to be limited to only the milling mask layers described herein.

Figure 9:
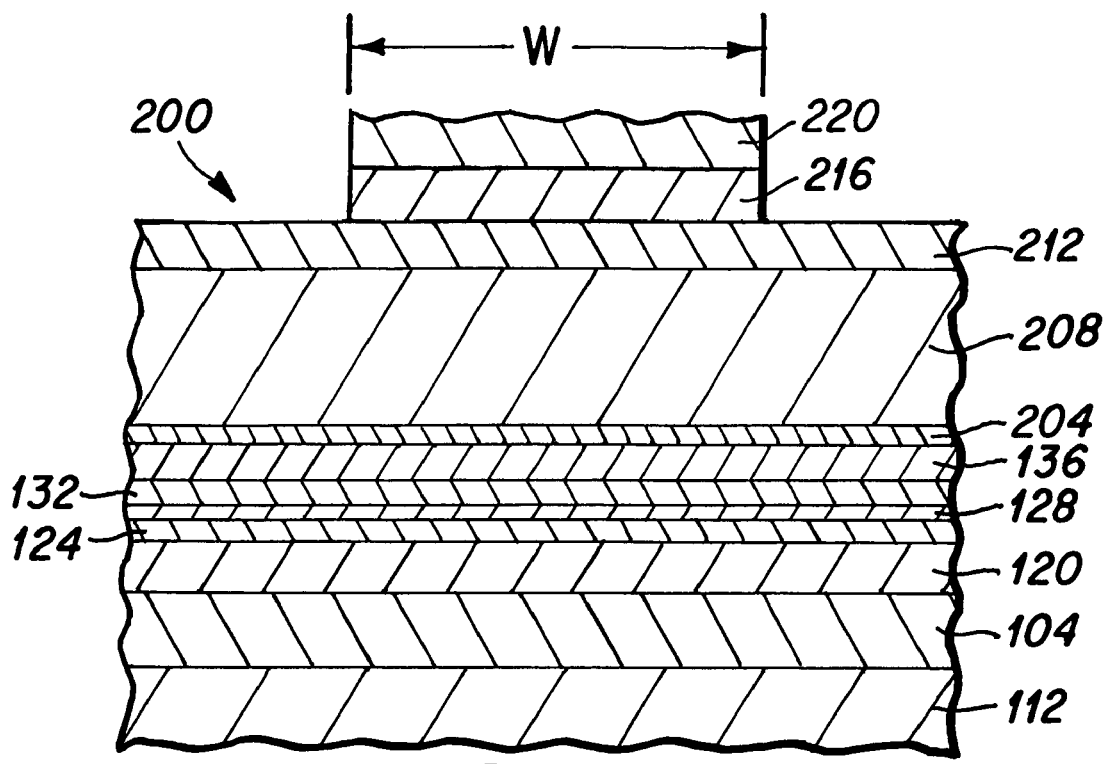
Figure 10:
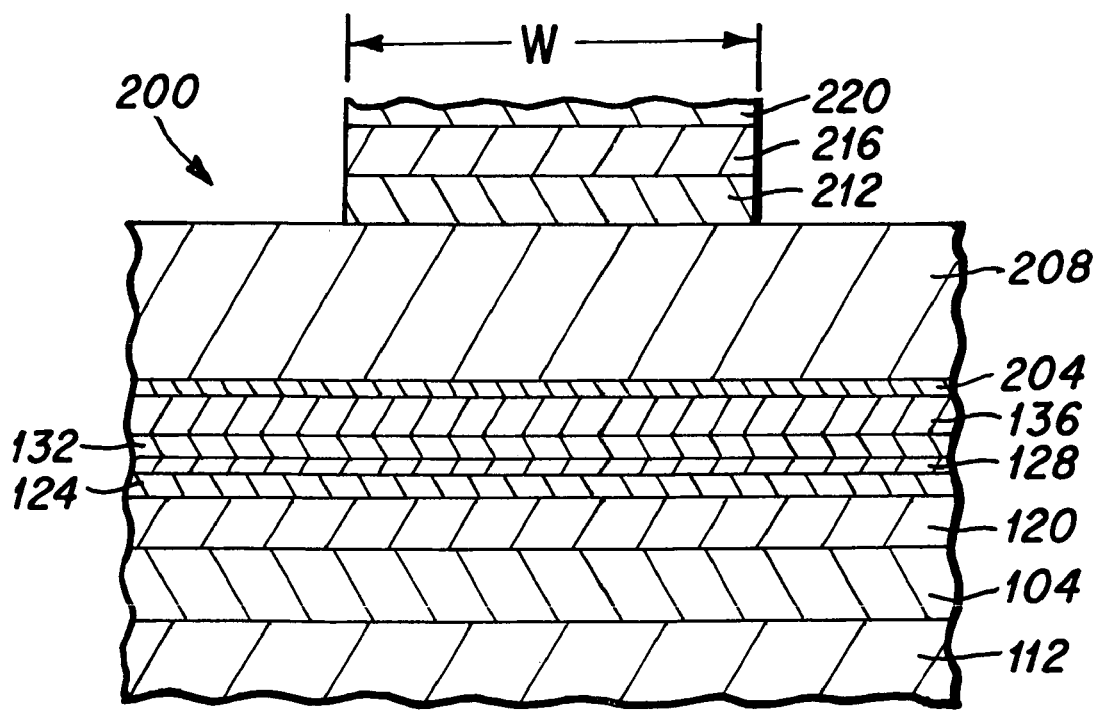
Figure 11:
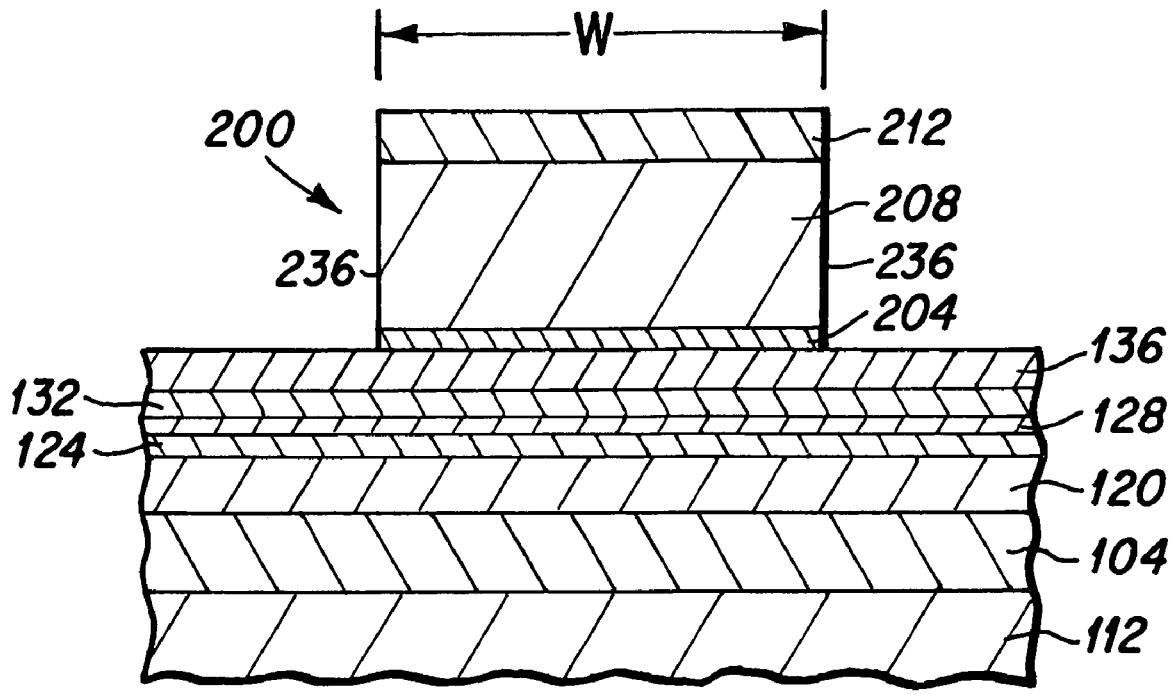

Thereafter, as depicted in FIG. 9, a first reactive ion etch (RIE) step is conducted utilizing a reactive species such as oxygen, to remove unmasked outer portions 224 (see FIG. 8) of the barc layer 216. Thereafter, as depicted in FIG. 10, a second RIE step is undertaken utilizing a reactive ion species such as fluorine, to remove unmasked outer portions of the silicon dioxide layer 212. As is next depicted in FIG. 11, a further RIE step using oxygen reactive species of next undertaken to remove unmasked outer portions of the first Duramide layer 208 and unmasked outer portions of the first DLC layer 204. At this point, a sensor milling mask 232 has been created which has straight sidewalls 236 and no undercuts. The straight sidewalls of the milling mask 232 are significant in producing the MR sensor 200.

Figure 12:
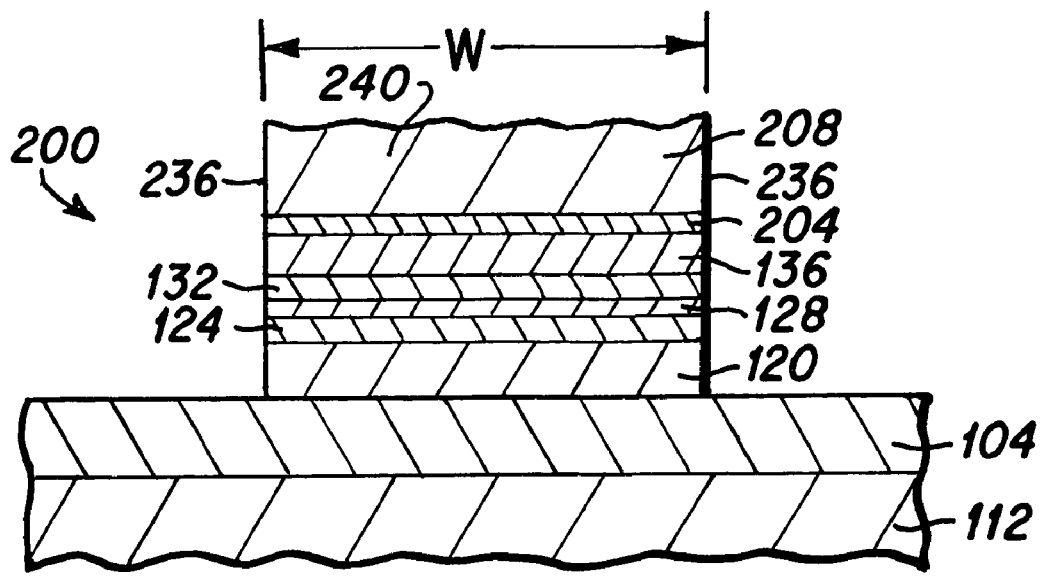

As is depicted in FIG. 12, a standard sensor layer ion milling step is next undertaken in which unmasked outer portions of the sensor layers are removed. While portions of the milling mask 232 are likewise removed in the ion milling process, it is important that a significant central portion 240 of the milling mask remain upon the central sensor layers at the termination of the ion milling step. It is desirable that the thickness of the remaining milling mask portion 240 be in the range of approximately 100 to 200 nm for the subsequent mask removal process that is described herebelow with the aid of FIG. 15.

Figure 13:
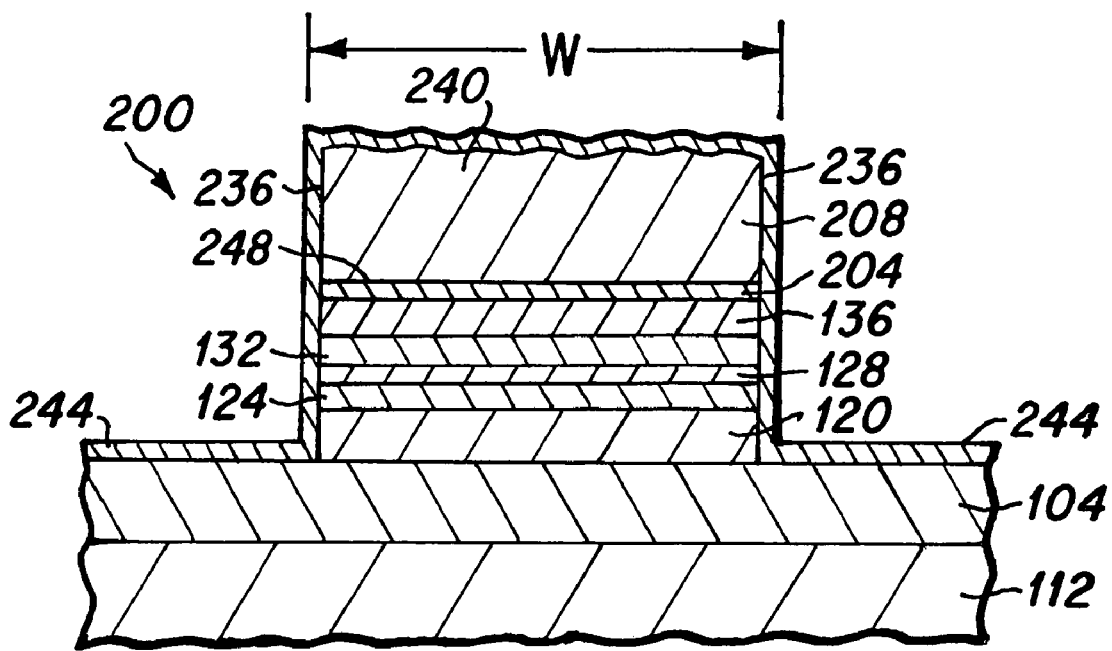

As is next depicted in FIG. 13, an atomic layer deposition (ALD) alumina insulation deposition step is next conducted in which a layer 244 of electrically insulative alumina having a thickness of approximately 50-100 Å is deposited across the surface of the wafer and upon the horizontal and vertical surfaces of the sensor. It is significant that the straight sidewalls of the mask 240 do not allow for alumina to be deposited upon the upper horizontal surfaces 248 of the sensor layers, as occurs in the prior art and is described hereabove.

Figure 14:
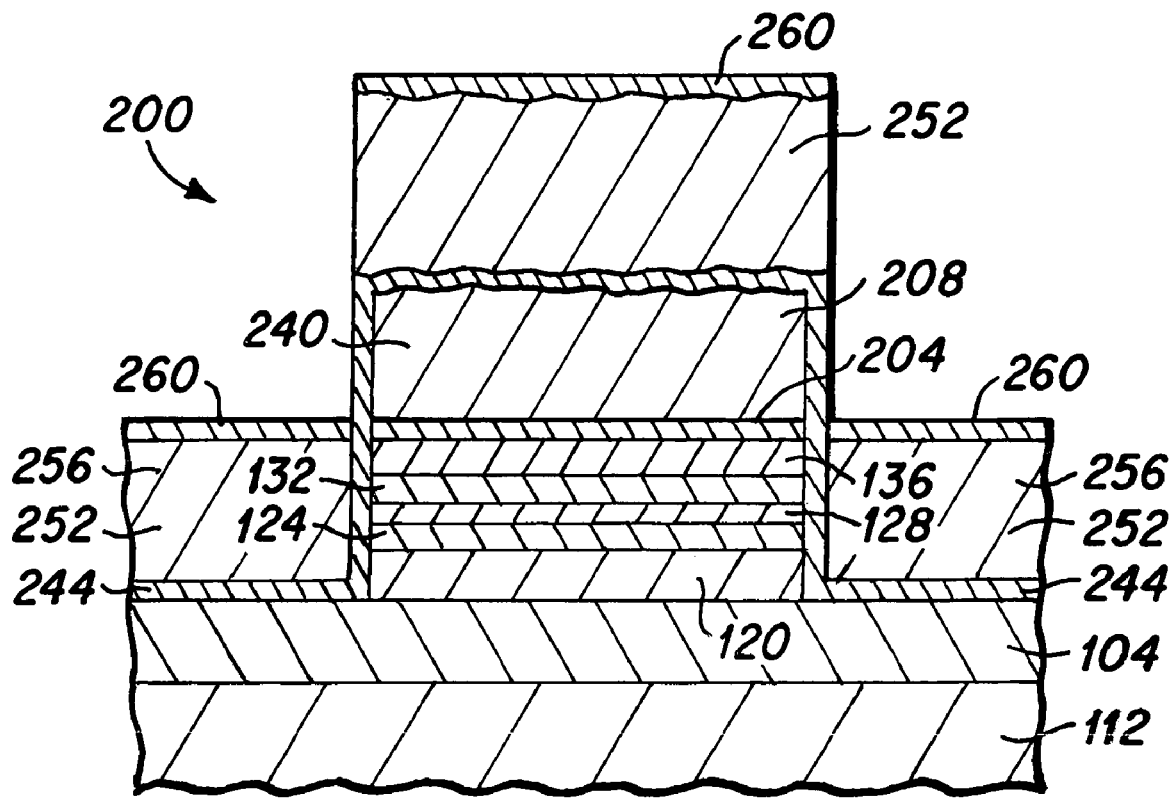

As depicted in FIG. 14, a magnetically soft shield material 252, such as nickel iron 80/20, is deposited upon the wafer in a thickness approximately equal to the thickness of the MR sensor stack. This soft magnetic material 252 will form the draped magnetic side shields 256 of a second magnetic shield, as is described herebelow. Following the deposition of the soft magnetic material 252, a second DLC layer 260 having a thickness of approximately 10-20 nm is deposited across the wafer surface. It is desirable that the level of the second DLC layer 260 be approximately equal to the level of the first DLC layer 204 that is deposited upon the MR sensor layers.

Figure 15:
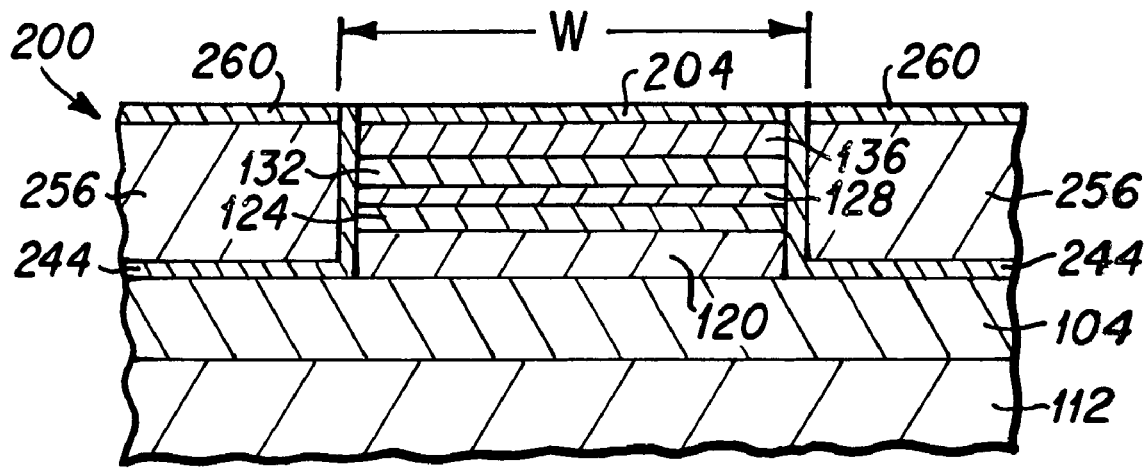

As is next depicted in FIG. 15, a chemical mechanical polishing (CMP) liftoff step is next conducted in which the projecting remaining portion 240 of the first Duramide mask and the layers subsequently deposited thereon are removed. Where there is an insufficient thickness of the first Duramide mask layer portion 240 remaining upon the first DLC layer 204 the CMP assisted liftoff step can be compromised. Thus a thickness of the remaining first Duramide layer 240 in the range of 100 to 200 nm is desired. The first DLC layer 204 and the second DLC layer 260 act as polishing stops to protect the layers therebelow during the CMP liftoff step.

Figure 16:
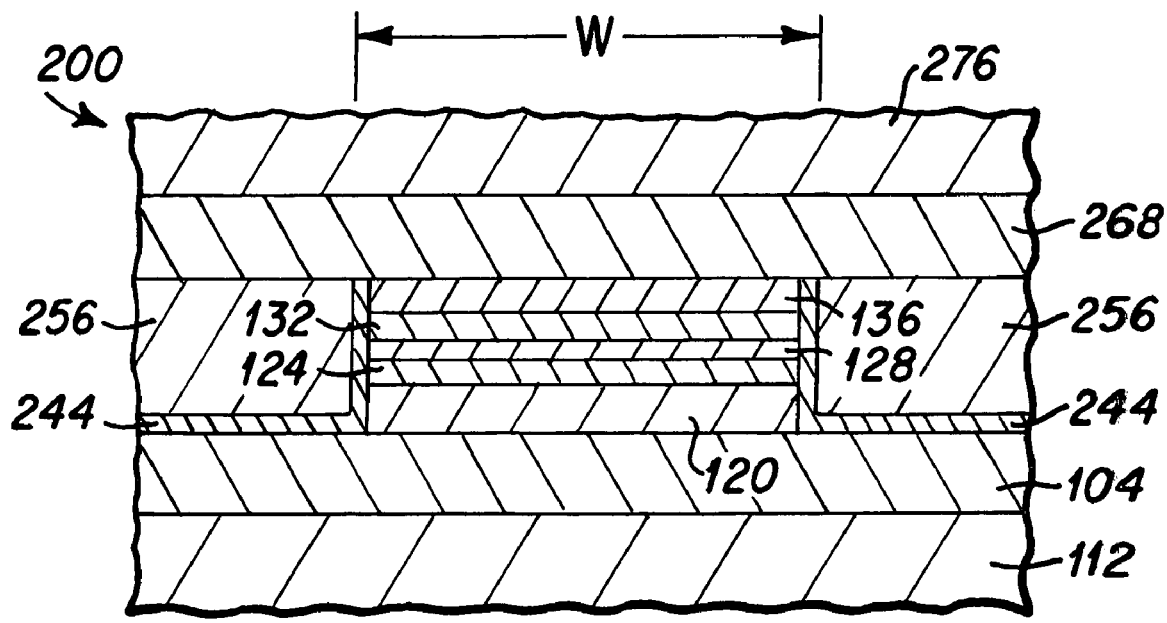

Following the CMP liftoff step, as is depicted in FIG. 16, an RIE step utilizing oxygen reactive species is conducted to remove the first and second DLC layers. Thereafter, a second magnetic shield layer 268 is fabricated in desired locations upon the wafer surface utilizing well known magnetic shield fabrication techniques. These may include the deposition of a seed layer (not shown) and the electroplating of the second magnetic shield 268 thereon. Significantly, as can be seen in FIG. 16, the second magnetic shield 268 and the previously deposited magnetic side shields 256 can now form a continuous draped second magnetic shield that provides side magnetic shield protection to the MR sensor, and the draped magnetic side shields 256 can become magnetically exchange coupled with the second magnetic shield layer 268. Thereafter, further well known magnetic head fabrication steps are conducted to create further magnetic head structures 276 to complete the fabrication of the magnetic head 202.

As can be seen in a comparison of the MR sensor 200 of the present invention with the prior art MR sensor 100 depicted in FIG. 6, the MR sensor 200 of the present invention does not include the alumina deposits 182 upon the top surface portions 186 of the MR sensor layers. This is because the milling mask 232 of the present invention is formed with straight sidewalls 236, as compared with the bilayer milling mask 160 of the prior art which is necessarily formed with undercuts 172 for effective wet chemical mask removal. As indicated hereabove, the milling mask 232 of the present invention is removed utilizing a CMP liftoff process coupled with subsequent RIE removal of the protective DLC layers, whereas the prior art milling mask 160 includes undercuts 172 and is removed utilizing a wet chemical stripping process.

As a result, the MR sensor 200 of the present invention is a current perpendicular to the plane (CPP) device that provides for improved sensor current flow through the MR sensor layers, whereby the MR sensor fabrication process of the present invention is suitable for fabricating MR sensors 200 having a reduced read track width W, as compared to MR sensors 100 that are manufactured utilizing the prior art fabrication methods.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What we claim is:

1. A method for fabricating a magnetic head including a magnetic sensor, comprising:
   depositing a first magnetic shield layer;
   depositing a plurality of sensor layers, including a top sensor layer having a top surface thereof, above said first magnetic shield layer;
   depositing a polishing stop layer above said top surface of the top sensor layer;
   forming a mask above the polishing stop layer for defining central and outer portions of the polishing stop layer and sensor layers, the central portions being positioned under the mask and the outer portions being not covered by the mask;
   removing the outer portions of said polishing stop layer and said sensor layers, such that the central portion of said polishing stop layer and said sensor layers remains, and side edges of said sensor layers are exposed;
   depositing an electrical insulation layer, such that said exposed side edges of said sensor layers are covered with said electrical insulation layer;
   fabricating side magnetic shield members above said electrical insulation layer;
   performing a CMP liftoff step; and
   fabricating a second magnetic shield layer above said top surface of said top sensor layer and above said side shield members.

2. A method for fabricating a magnetic head as described in claim 1 wherein the polishing stop layer is removed such that said second magnetic shield layer makes contact with said top surface of said top sensor layer.

3. A method for fabricating a magnetic head as described in claim 1 wherein said electrical insulation layer has a thickness of approximately 50-100 Å.

4. A method for fabricating a magnetic head as described in claim I wherein said side shield members have a thickness that is approximately equal to the thickness of said sensor layers minus the thickness of said electrical insulation layer.

5. A method for fabricating a magnetic head as described in claim 1 wherein said sensor layers include an in-stack magnetic biasing layer.

6. A method for fabricating a magnetic head as described in claim 1 wherein said magnetic sensor is a tunnel valve sensor.

7. A method for fabricating a magnetic head as described in claim 1 wherein said magnetic sensor is a current perpendicular to the plane (CPP) sensor.

8. A method for fabricating a magnetic head as described in claim 1 wherein said electrical insulation layer is deposited in part upon said first magnetic shield layer.

9. A method for fabricating a magnetic head as described in claim 1 wherein said CMP liftoff step is preceded by:
   depositing a second polishing stop layer upon said side shield members;
   said CMP liftoff step is performed to remove said remaining portion of said central portion of said milling mask layers; and
   said polishing stop layer and said second polishing stop layer are removed following said CMP liftoff step and before said second magnetic shield is fabricated.

10. A method for fabricating a magnetic head as described in claim 9 wherein said polishing stop layer and said second polishing stop layer each are formed with a thickness of approximately 10-20 nm.

11. A method for fabricating a magnetic head as described in claim 1 wherein said electrical insulation layer is comprised of alumina and is deposited utilizing an atomic layer deposition process.

12. A method for fabricating a magnetic head as described in claim 1 wherein said step of forming a mask above said polishing layer includes depositing milling mask layers above said polishing stop layer; wherein after said step of removing the outer portions of said polishing stop layer and said sensor layers, said central portion of said polishing stop layer and said sensor layers is covered by a remaining portion of said central portion of said milling mask layer.

13. A method for fabricating a magnetic head as described in claim 12 wherein said milling mask layers are comprised of a first organic material layer, a silicon dioxide layer, a second organic material layer and a photoresist layer.

14. A method for fabricating a magnetic head as described in claim 13 wherein said step of removing outer portions of said milling mask layers includes conducting a first reactive ion etch (RIE) step utilizing oxygen reactive species, conducting a second RIE step utilizing fluorine reactive species and conducting a third RIE step utilizing oxygen reactive species.

15. A method for fabricating a magnetic head as described in claim 12 wherein said remaining portion of said central portion of said milling mask layers has a thickness of approximately 100 to 200 nm.

16. A method for fabricating a magnetic head as described in claim 13 wherein said first organic material layer is deposited with a thickness of approximately 600-1200 nm, said silicon dioxide layer is deposited with a thickness of approximately 80-120 nm.

17. A method for fabricating a magnetic head including a magnetic sensor, comprising:
   depositing a first magnetic shield layer;
   depositing a plurality of sensor layers, including a top sensor layer having a top surface thereof, upon said first magnetic shield layer;
   depositing a polishing stop layer upon said top surface;
   removing outer portions of said polishing stop layer and said sensor layers. such that a central portion of said polishing stop layer and said sensor layers remains, and side edges of said sensor layers are exposed;
   depositing an electrical insulation layer, such that said exposed side edges of said sensor layers are covered with said electrical insulation layer;
   fabricating side magnetic shield members upon said electrical insulation layer;
   performing a GMP liftoff step; and
   fabricating a second magnetic shield layer upon said top surface of said top sensor layer and upon said side shield members,
   wherein said step of removing outer portions of said polishing stop layer and said sensor layers further includes:
   depositing milling mask layers upon said polishing stop layer;
   removing outer portions of said milling mask layers, such that a central portion of said milling mask layers is disposed at a location where the magnetic sensor is fabricated;
   removing outer portions of said polishing stop layer;
   removing outer portions of said sensor layers, such that said central portion of said polishing stop layer and said sensor layers is covered by a remaining portion of said central portion of said milling mask layers.

18. A method for fabricating a magnetic head as described in claim 17 wherein said milling mask layers are comprised of a first organic material layer, a silicon dioxide layer, a second organic material layer and a photoresist layer.

19. A method for fabricating a magnetic head as described in claim 18 wherein said step of removing outer portions of said milling mask layers includes conducting a first reactive ion etch (RIE) step utilizing oxygen reactive species, conducting a second RIE step utilizing fluorine reactive species and conducting a third RIE step utilizing oxygen reactive species.

20. A method for fabricating a magnetic head as described in claim 18 wherein said first organic material layer is deposited with a thickness of approximately 600-1200 nm, said silicon dioxide layer is deposited with a thickness of approximately 80-120 nm.

21. A method for fabricating a magnetic head as described in claim 17 wherein said remaining portion of said central portion of said milling mask layers has a thickness of approximately 100 to 200 nm.

* * * * *

UNITED STATES PATENT AND TRADEMARK OFFICE
CERTIFICATE OF CORRECTION

PATENT NO. : 7,574,791 B2
APPLICATION NO. : 11/126508
DATED : August 18, 2009
INVENTOR(S) : Araki et al.

Page 1 of 1

It is certified that error appears in the above-identified patent and that said Letters Patent is hereby corrected as shown below:

col. 7, line 36 change "claim I" to --claim 1--;
col. 8, line 46 change "GMP" to --CMP--.

Signed and Sealed this

Third Day of November, 2009

David J. Kappos
*Director of the United States Patent and Trademark Office*